May 29, 1934.  R. G. JONES  1,960,848
POLYPHASE METER
Filed Nov. 18, 1929
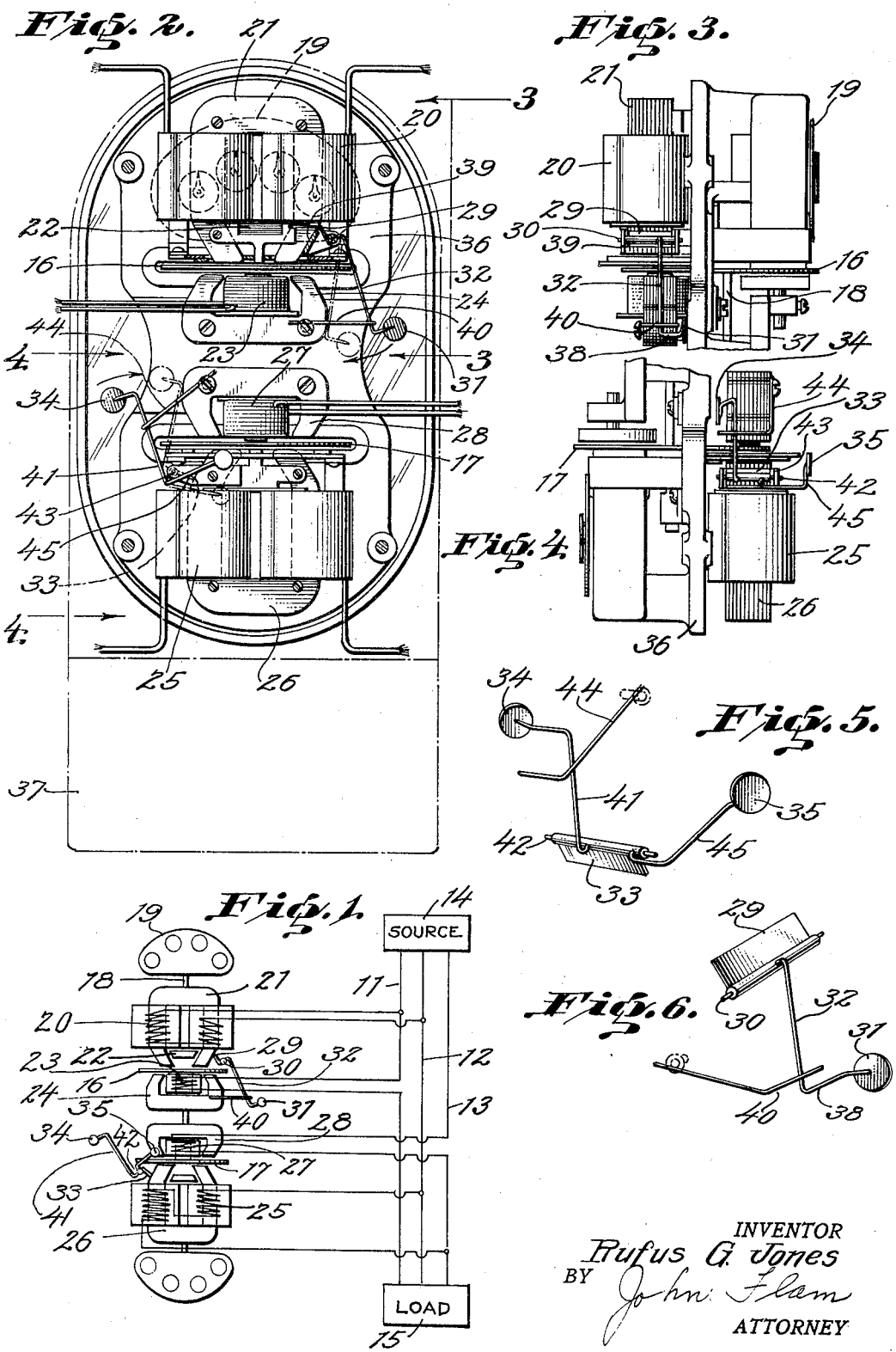
INVENTOR
Rufus G. Jones
BY John Flam
ATTORNEY Patented May 29, 1934

1,960,848

UNITED STATES PATENT OFFICE 1,960,848

POLYPHASE METER

Rufus G. Jones, Riverside, Calif.

Application November 18, 1929, Serial No. 407,973

2 Claims. (Cl. 177—311)

This invention relates to a polyphase electric meter.

Electrical power or energy measurements made on polyphase systems, are usually accomplished by the aid of a pair of meter elements. For convenience, both these meter elements usually operate on a common indicator or register, which is actuated in accordance with the algebraic sum of the measurements of both units.

Each unit or element, as is well understood, utilizes a potential coil as well as a current coil acting on a rotatable conductor disc if the instrument registers energy such as kilowatt hours, or an equivalent movable conductor if the instrument indicates power, such as kilowatts.

Since both elements are active on the same indicator or register, it may readily happen that if the potential coil of one of them is open circuited or inoperative, only one element will serve to actuate the instrument, which will produce a false indication. No way of readily detecting the inoperative condition of one element of the instrument is available, since the meter nevertheless appears to operate, due to the activity of the other element. If however, one of the current coils is inactive, or open circuited, the load with which the coil is in series would also be disconnected. Therefore in such an instance, the occurrence of trouble becomes apparent.

It is an object of my invention to make it possible readily to detect the inoperativeness of a meter element in a polyphase meter.

I accomplish this result by providing an indicating disc for each element which is brought into view only when the potential coil is active, and is obscured when that coil is inactive.

It is another object of my invention to provide a simple and inexpensive indicating device of this character, and especially by providing only one moving part for operating the device.

In order to secure these results, I make use of the magnetic forces present in the core of the potential coil, when the coil is energized. I provide a movable magnetic element responding to the energization of the core; and it is still another object of my invention so to arrange this element in relation to the core that the operation of the element does not influence the correct or proper registration of the meter.

This beneficial result is obtained by placing the movable magnetic element opposite the core at a locality remote from that of the moving disc.

Due to the fact that the movable part and the associated target are compactly arranged, they can be supported readily in a position remote from the current carrying parts of the meter, whereby any danger of short-circuiting is very materially reduced.

It is also a further object of my invention to reduce vibration of the movable member which may occur due to the use of alternating current, and especially by making the movable member in the form of a thin vane, which sets itself in line with the lines of force, of the leakage flux, and not transverse thereto, when the core is energized. In this way, there is sufficient magnetic attraction to operate the light vane, but not sufficient to cause any vibration thereof.

It is still another object of my invention to provide indicators or targets that do not interfere with or obscure to any extent, the register of the meter.

My invention possesses many other advantages, and has other objects which may be made more easily apparent from a consideration of one embodiment of my invention. For this purpose I have shown a form in the drawing accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawing:

Figure 1 is a diagram of a polyphase system in which my invention is embodied;

Fig. 2 is a rear view of a polyphase meter, showing the case in dot and dash lines, in which the signaling or indicating flags or targets are incorporated;

Fig. 3 is a side view of the top element of the meter shown in Fig. 2, taken from a plane 3—3 of Fig. 2;

Fig. 4 is a view similar to Fig. 3, but taken of the lower element of the meter, from plane 4—4 of Fig. 3;

Fig. 5 is a pictorial view of the indicating mechanism utilized in connection with the lower element of the meter; and Fig. 6 is a similar pictorial view of the indicating mechanism utilized in connection with the upper element of the meter.

In Fig. 1 there are shown the polyphase mains 11, 12, 13, which lead from source 14 to a load 15. There is shown a two element polyphase meter to measure the energy consumption. This meter includes a pair of discs 16, 17 mounted on a rotatable shaft 18 which can operate a register such as 19.

The top element includes a potential coil 20 wound on a two-legged core 21, the legs of which embrace a magnetic bridge 22. Magnetic leakage from the core 21 affects disc 16. The current coil 23 is wound on the center leg of a three-legged core 24, which legs are opposed to the adjacent disc surface. This coil 23 is in series with one of the mains, such as 11, while coil 20 is across two of the mains, one of which is the same as that in which coil 23 is included. This method of connection of meters is well understood, and no further explanation is necessary.

The lower meter element is entirely similar to the top element. It includes the potential coil 25 on core 26, and current coil 27 on core 28. The coil 27 is in series with another main, such as 13, and coil 25 is across this main 13 and that main (such as 12) in which there is no series coil. It is well known that such a connection, if the coil terminals are properly chosen, will result in the actuation of the meter register in accordance with the true wattage expended in the network.

It is obvious that if either coil 20 or 25 be open-circuited as by a break in the conductor, the meter would nevertheless register, but the registration would be incorrect. In order to indicate that the meter is in full operative condition, I provide flags or signals that are in sight only when their respective potential coil is operative. Thus for example, I provide a light vane 29 of magnetic material that is free to move on an axis 30. This vane when coil 20 is energized, is held in the stream of leakage magnetic lines of force, and brings a flag 31 into view from back of the instrument. This flag fastened on rod 32 is carried by vane 29. When coil 20 is deenergized, the weight of flag 31 carries it out of sight behind the instrument.

The lower element potential coil 25 also has a similar signaling arrangement. In this case, a vane 33 holds the flag 34 extended when coil 25 is energized; but counterweight 35 serves to rotate the vane in a clockwise direction when coil 25 is deenergized, to pull flag 34 back out of sight.

It is thus apparent that the flags 31, 34 are both visible when the elements are both active, but they are respectively retracted when their associated potential coils are dead. This serves definitely to apprise an attendant or operator of the condition of the instrument.

In Figs. 2 to 6 inclusive, I have shown an actual embodiment of a meter incorporating my invention, the parts shown in Fig. 1 being similarly indexed. Fig. 2 is a rear view of the instrument. The frame upon which all of the operative parts are supported is indicated at 36. The flags 31, 34 and their associated mechanisms are supported at the rear of frame 36 so that, as shown in Fig. 2, the retracted positions of the flags 31, 34 will position them out of sight behind frame 36.

I also indicate a casing 37 for the instrument.

As shown most clearly in Fig. 6, flag 31 is fastened to the wire or rod 32 which is bent at an angle at 38 to support the flag. This wire or rod is fastened to the vane 29 near its center, the pivot 30 of which is accommodated in a bracket 39 fastened to core 21. A stop 40 made of wire and fastened to core 24 prevents flag 31 from projecting too far out beyond frame 36.

The flag 34 and its supporting wire 41 are both clearly shown in Fig. 5. Wire 41 is fastened to vane 33, the pivot 42 of which is accommodated in a bracket 43 fastened to core 26. A stop bar 44, supported on core 28, prevents flag 34 from projecting too far out beyond frame 36. Counterweight 35 supported on wire 45 retracts the flag 34 when the coil 25 is deenergized.

As shown most clearly in Fig. 2, vanes 29, 33 in attracted positions, take up a position substantially at right angles to adjacent parts of cores 21, 26, since this is the direction of the leakage flux which attracts the vanes.

The vanes 29, 33 being light, this leakage flux is sufficient to hold the flags 34, 31 in view at each side of the mechanism. Furthermore these vanes being remote from the gaps formed between the sets of cores 21, 24 and 26, 28, do not interfere with accurate registration.

I claim:

1. In a polyphase registering electric meter, a potential coil, a core for the coil, a movable registering element adapted to be influenced by the core when the coil is energized, said element being adjacent flux emitting portions of the core, and means for indicating whether the coil is energized, comprising a thin magnetic vane, means for movably mounting said vane, so as to cooperate with that part of the leakage flux from the core, which is magnetically remote from the portions influencing the registering element, and incapable of affecting the registering element, said vane being attracted to move into alinement with the direction of the said leakage flux when the coil is energized.

2. In a polyphase registering electric meter, a potential coil, a core for the coil, a movable registering element adapted to be influenced by the core when the coil is energized, said element being adjacent flux emitting portions of the core, and means for indicating whether the coil is energized, comprising a thin magnetic vane, cooperating with that part of the leakage flux from the core, which is magnetically remote from the portions influencing the registering element, and incapable of affecting the registering element, said vane being pivotally mounted so that it is attracted to swing on its pivot when the coil is energized, by the said leakage flux to aline itself with the direction of said leakage flux.

RUFUS G. JONES.